(12) United States Patent
Caruso

(10) Patent No.: US 9,528,712 B2
(45) Date of Patent: Dec. 27, 2016

(54) MODULATING BURNER SYSTEM

(71) Applicant: Pat Caruso, Stoney Creek (CA)

(72) Inventor: Pat Caruso, Stoney Creek (CA)

( * ) Notice: Subject to any disclaimer, the term of this patent is extended or adjusted under 35 U.S.C. 154(b) by 519 days.

(21) Appl. No.: 14/064,282

(22) Filed: Oct. 28, 2013

(65) Prior Publication Data

US 2014/0124587 A1    May 8, 2014

Related U.S. Application Data

(60) Provisional application No. 61/722,380, filed on Nov. 5, 2012.

(51) Int. Cl.
*F23D 14/02* (2006.01)
*F23N 1/02* (2006.01)
(Continued)

(52) U.S. Cl.
CPC ........... *F24D 19/1084* (2013.01); *F23N 1/022* (2013.01); *F23N 1/025* (2013.01); *F23N 3/085* (2013.01); *F24D 5/08* (2013.01); *F23N 2005/181* (2013.01); *F23N 2025/12* (2013.01); *F23N 2033/08* (2013.01); *F23N 2035/16* (2013.01); *G05D 11/006* (2013.01)

(58) Field of Classification Search
CPC ...... F23D 14/02; F23D 19/1084; F23C 7/008; F23N 1/022; F23N 1/025; F23N 1/085; F23N 1/027; F23N 2025/12; F23N 2033/08; F23N 2035/16; F23N 2035/06; F23N 3/087; F23N 2005/181; F24D 19/10; G05D 7/0113; G05D 7/0193; G05B 5/04; G05B 6/05; G05B 11/46
USPC .................................................... 431/12, 181
See application file for complete search history.

(56) References Cited

U.S. PATENT DOCUMENTS 2,285,287 A * 6/1942 Krogh .................... C21D 11/00
                                                         137/94
2,777,457 A * 1/1957 Luppold, Jr. ........... F23D 14/60
                                                         137/82
(Continued)

FOREIGN PATENT DOCUMENTS

CH    EP 0450173 A1 * 10/1991 ............. F23N 1/027
DE    EP 0505714 A2 *  9/1992 ............. F23N 1/027
(Continued)

OTHER PUBLICATIONS

"EP_450173_A1_M—Machine Translation.pdf", Machine Translation, EPO.org, Mar. 29, 2016.*

*Primary Examiner* — Gregory Huson
*Assistant Examiner* — Daniel E Namay

(57) ABSTRACT

A modulating burner system includes a speed control responsive to inputs received from a thermostat. The speed control modulating a blower which provides combustion air and a vacuum proportional to the speed of the blower. The modulating burner system further includes a gas amplifying valve in communication with the vacuum via a vacuum conduit. The gas amplifying valve providing modulated combustion gas responsive to the vacuum; wherein modulated combustion air and gas communicated to a burner for continuously variable firing rates of 50 to 100% of the maximum firing rate. The modulating burner system further includes control circuit dampers for smoothing out vacuum spikes and fluctuations.

12 Claims, 2 Drawing Sheets

(51) Int. Cl.
*F24D 19/10* (2006.01)
*F23N 3/08* (2006.01)
*F24D 5/08* (2006.01)
F23D 14/34 (2006.01)
G05D 11/03 (2006.01)
G05D 7/01 (2006.01)
G05D 11/00 (2006.01)
F23N 5/18 (2006.01)

(56) References Cited

U.S. PATENT DOCUMENTS

| | | | | | |
|---|---|---|---|---|---|
| 3,481,538 | A | * | 12/1969 | Dines | F23N 1/025 110/103 |
| 3,935,708 | A | * | 2/1976 | Harrewijne | F02G 1/043 123/568.11 |
| 4,645,450 | A | * | 2/1987 | West | F23N 1/022 431/12 |
| 4,874,116 | A | * | 10/1989 | Fallon | B67D 1/1252 222/152 |
| 5,190,454 | A | * | 3/1993 | Murray | F23N 1/022 431/12 |
| 5,520,533 | A | * | 5/1996 | Vrolijk | F23N 1/027 137/100 |
| 5,630,408 | A | * | 5/1997 | Versluis | F23N 1/027 122/14.21 |
| 5,989,011 | A | * | 11/1999 | Caruso | F23D 14/60 126/91 A |
| 6,019,593 | A | * | 2/2000 | Lewandowski | F23D 14/36 431/12 |
| 6,135,063 | A | * | 10/2000 | Welden | F22B 1/26 122/446 |
| 6,533,574 | B1 | * | 3/2003 | Pechoux | F23N 5/188 431/12 |
| 6,537,060 | B2 | * | 3/2003 | Vegter | F23N 1/002 431/12 |
| 6,547,554 | B2 | * | 4/2003 | Koegl | F23D 14/36 126/19 R |
| 6,561,791 | B1 | * | 5/2003 | Vrolijk | F23N 1/022 431/12 |
| 6,579,087 | B1 | * | 6/2003 | Vrolijk | F23N 1/022 431/12 |
| 6,786,225 | B1 | * | 9/2004 | Stark | F23N 1/007 126/116 A |
| 7,101,172 | B2 | * | 9/2006 | Jaeschke | F23N 3/08 126/110 R |
| 8,418,661 | B2 | * | 4/2013 | Kanda | F23D 14/04 122/31.1 |
| 9,097,419 | B2 | * | 8/2015 | Zatti | F23D 14/60 |
| 9,234,661 | B2 | * | 1/2016 | Young | F23N 1/022 |
| 2001/0051321 | A1 | * | 12/2001 | La Fontaine | F23N 1/022 431/12 |
| 2003/0013054 | A1 | * | 1/2003 | Fredricks | F23D 14/60 431/12 |
| 2003/0013056 | A1 | * | 1/2003 | Fredricks | F23D 14/60 431/90 |
| 2004/0043345 | A1 | * | 3/2004 | Jaeschke | F23N 3/08 431/18 |
| 2004/0214118 | A1 | * | 10/2004 | Sullivan | F23N 1/022 431/12 |
| 2006/0292505 | A1 | * | 12/2006 | Giacomelli | F23N 1/005 431/12 |
| 2008/0113307 | A1 | * | 5/2008 | Min | F23N 1/027 431/90 |
| 2008/0182214 | A1 | * | 7/2008 | Cox | F23N 1/045 431/12 |
| 2009/0111065 | A1 | * | 4/2009 | Tompkins | F23N 1/022 431/12 |
| 2009/0197212 | A1 | * | 8/2009 | Masen | F23N 1/022 431/12 |
| 2010/0009303 | A1 | * | 1/2010 | Santinanavat | F16K 31/128 431/12 |
| 2010/0126431 | A1 | * | 5/2010 | Kanda | F23D 14/04 122/14.21 |
| 2010/0330520 | A1 | * | 12/2010 | Kanda | F23D 14/60 431/350 |
| 2011/0003260 | A1 | * | 1/2011 | Zanella | F23N 1/007 431/12 |
| 2011/0139045 | A1 | * | 6/2011 | Zatti | F23D 14/60 110/188 |
| 2011/0223548 | A1 | * | 9/2011 | Fan | F23N 1/022 431/12 |
| 2013/0273481 | A1 | * | 10/2013 | Okazaki | F23L 7/007 431/12 |
| 2014/0080075 | A1 | * | 3/2014 | Young | F23N 1/022 431/76 |
| 2016/0123584 | A1 | * | 5/2016 | Young | F23N 1/022 431/89 |

FOREIGN PATENT DOCUMENTS

| | | | | |
|---|---|---|---|---|
| JP | 58224225 | A | * | 12/1983 |
| JP | 58224226 | A | * | 12/1983 |
| JP | 58224227 | A | * | 12/1983 |
| JP | 58224228 | A | * | 12/1983 |
| JP | 59142329 | A | * | 8/1984 |
| JP | 63073017 | A | * | 4/1988 |
| JP | 03055424 | A | * | 3/1991 |
| JP | 04270812 | A | * | 9/1992 |
| JP | 04270813 | A | * | 9/1992 |
| JP | 04270814 | A | * | 9/1992 |
| JP | 2010127577 | A | * | 6/2010 |
| JP | 2011012897 | A | * | 1/2011 |
| NL | EP 0390964 | A2 | * | 10/1990 ............ F23N 1/027 |

* cited by examiner

MODULATING BURNER SYSTEM

The application claims priority from previously filed U.S. provisional patent application Ser. No. 61/722,380 titled MODULATING BURNER SYSTEM, which was filed on Nov. 5, 2012 in the name of Pat Caruso.

FIELD OF THE INVENTION

The present invention relates to fuel burner control systems and more particularly to fuel burner control system for radiant tube heating devices.

BACKGROUND OF THE INVENTION

Current burner control systems normally fire at a predetermined firing rate and control the temperature normally by turning the burner on and off. Recently there have been some burner control systems developed which are able to vary the firing rates discretely by using a plurality of predetermined fuel pressures for accommodating various demands of heating. Therefore, rather than turning the burner completely on and off, the burner is able to operate at normally two pre selected firing rates. One such burner control system is described in U.S. Pat. No. 5,353,986 filed on Jun. 15, 1993 and titled "Demand Radiant Heating System" by Joseph B. Wortman. This particular burner control system which is used for a radiant tube heating application, utilizes a multi stage or more precisely a two stage fuel regulator in order to achieve two discrete firing rates. This burner control system achieves a plurality of predetermined pressures however, it is not able to continuously variably control the fuel pressure and therefore the firing rate over a predetermined range of firing rates.

In some applications it is desirable to be able to continuously variably control the firing rate and hence it is desirable to have a burner control system which is able to continually variably control the fuel pressure for continuously variable firing rates.

BRIEF DESCRIPTION OF THE DRAWINGS

The concept will now be described by way of example only with reference to the following drawings in which.

DESCRIPTION OF THE PREFERRED EMBODIMENTS

Figure 1:
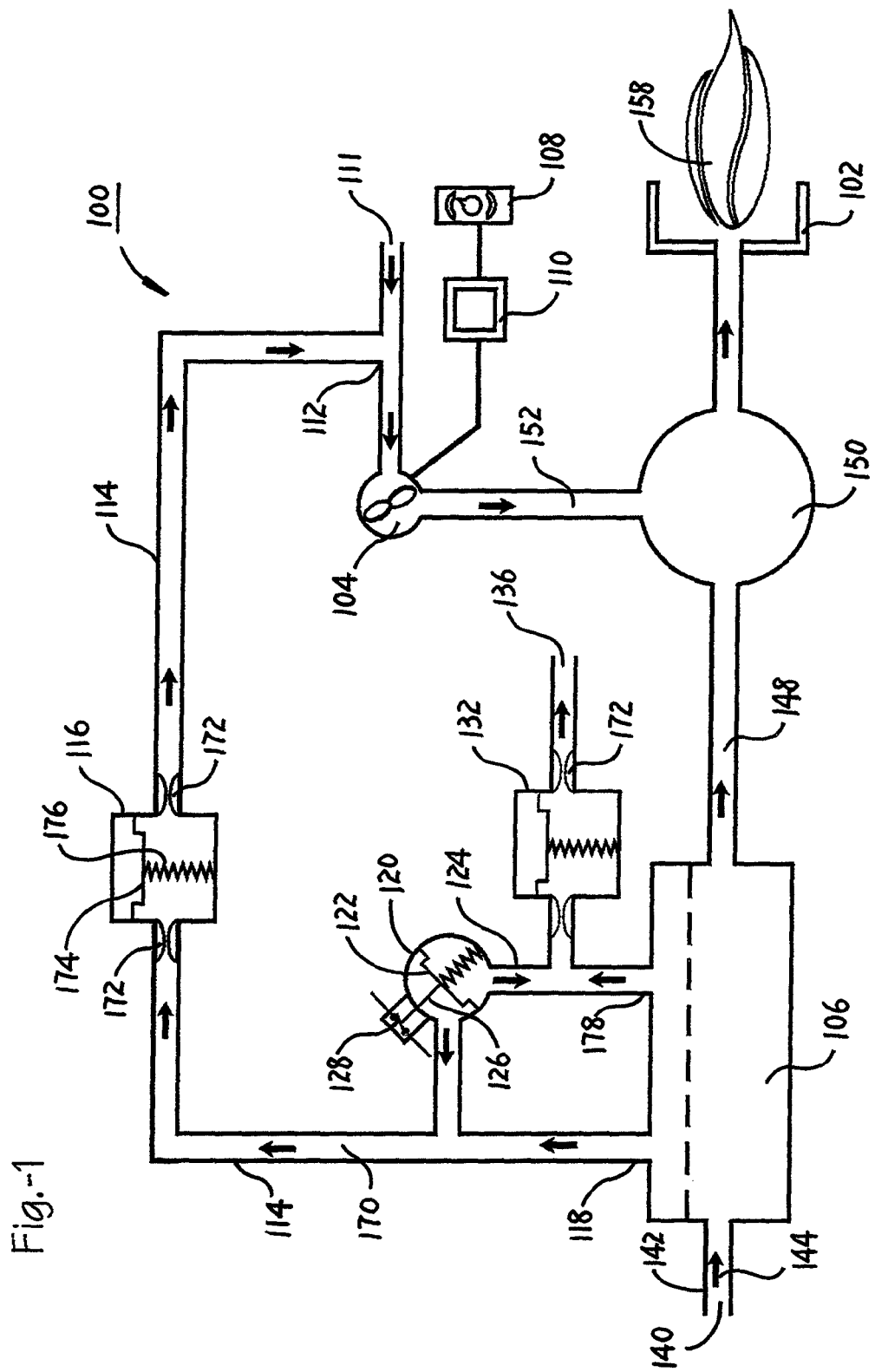
FIG. 1 illustrates schematically a preferred embodiment of a modulating burner system made in accordance with the present concept which is shown with the switch in the closed position.
Figure 2:
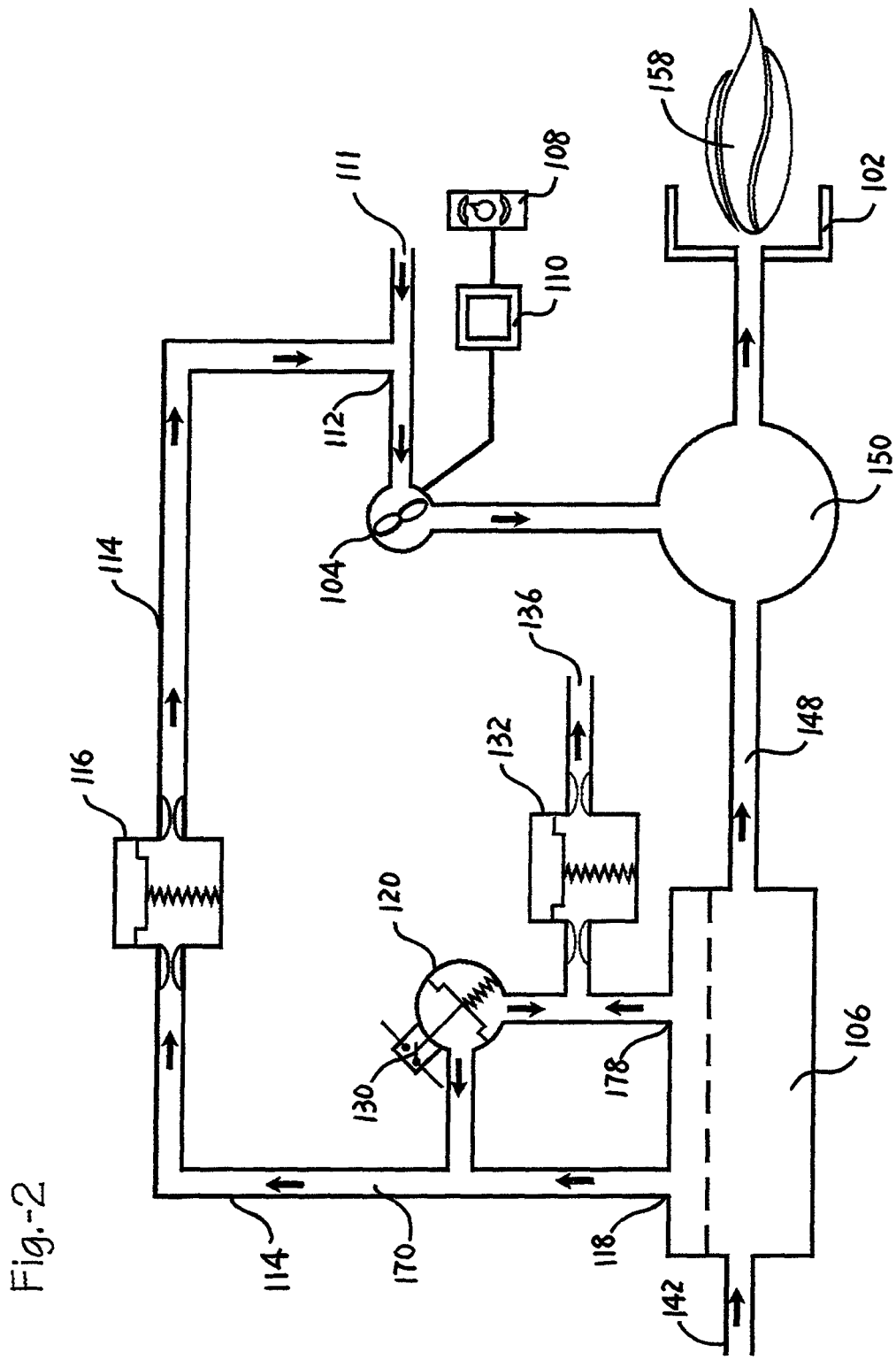
FIG. 2 illustrates schematically a preferred embodiment of a modulating burner system made in accordance with the present concept which is shown with the switch in the open position.

The present concept relates to control of pneumatic gas amplifying valves and/or simply gas valves in a continuously variable firing rate modulating burner system. The present concept does not relate to mechanical gas valve control nor to electrical or electronic gas valve control. In attempting to provide for a simple and inexpensive pneumatic gas valve control, the applicant encountered that the oscillations and pulsations which naturally occur within any blower which provides combustion air to the burner is large enough to prevent proper modulating control of gas amplifying valves. The applicant discovered the use of dampers within the control circuit, in this case first damper 116 and second damper 132. These dampers were found to provide a uniform vacuum within the control circuits namely; vacuum conduit 114 and air conduit 124, to provide a smooth enough differential pressure to provide accurate control of gas amplifying valve 106. FIGS. 1 and 2 illustrate a preferred embodiment of the modulating system burner shown generally as 100 in the Figures.

Modulating burner system 100 includes the following major components namely a burner 102, a blower 104, and a gas amplifying valve 106.

Blower 104 is controlled by thermostat 108 which sends a signal to speed controller 110 which controls the speed of blower 104.

A vacuum is obtained off of blower 104 at a vacuum takeoff 112 and this vacuum is communicated through a vacuum conduit 114 and through a first damper 116 and onto a connection at a first port 118 of the gas amplifying valve 106.

Additionally there is a safety shutoff 120 which communicates on one side of diaphragm 122 with vacuum conduit 114 and on the other side of diaphragm 122 with air conduit 124.

An actuator 126 connected to diaphragm 122 will actuate switch 128 in response to the pressures and/or vacuums which are present on either side of diaphragm 122 of safety shutoff 120.

Safety shutoff 120 is set up in such a manner that when a threshold value of pressure differential is obtained switch 128 moves to the open position 130 as shown in FIG. 2 thereby shutting down the entire modulating burner system.

Second damper 132 communicates with air conduit 124 and also with controlled atmosphere outlet 136.

Controlled atmosphere outlet 136 normally would be open to the atmospheric pressure found within the control box housing modulating burner system 100 which could be slightly negative due to the presence of blower 104 which is housed within a control box not shown in the diagrams.

Gas enters through gas inlet 140 along gas conduit 142 thereby providing gas flow 144 through gas amplifying valve 106 and exits as combustion gas 148 into fuel air mixer 150.

Fuel air mixer 150 receives combustion air 152 from blower 104 and mixes it with combustion gas 148 and this combustible mixture is communicated to burner 102 producing a flame 158.

In Use

In the instance when more heat is called for a signal from thermostat 108 would be sent to speed control 110 which would control blower 104 to increase its speed and therefore the amount of combustion air 152 being sent to fuel air mixer 150. The vacuum at vacuum takeoff 112 would increase as blower 104 speed increases.

This increase in vacuum is communicated to the first port 118 of gas amplifying valve 106 calling for an increase of the amount of gas flow 144 through gas amplifying valve and exiting as combustion gas 148.

In this manner the amount of combustion gas 148 being delivered to fuel air mixer 150 increases as the amount of combustion air 152 is also delivered to fuel air mixer 150 by blower 104 thereby ensuring that there is a proper air fuel ratio being maintained and the firing rate of burner 102 is increased as heat is called for.

The reader will note that there is a first damper 116 mounted along vacuum conduit 114 which is designed to even out the pulsations received along vacuum conduit 114 due to the deceleration and acceleration of blower 104 in addition to natural vacuum pulsations which may be received at vacuum takeoff 112 due to oscillations and pulsations which naturally occur within any blower 104.

The first damper 116 ensures that a smooth even vacuum is found within the dampened vacuum portion 170 of vacuum conduit 114. The dampened vacuum portion 170 of vacuum conduit 114 is that portion extending between first port 118 and the inlet at first damper 116.

The reader will also note that first damper 116 as well as second damper 132 both include orifices 172 which help in dampening of the pressure and vacuums within the attached line.

Each damper includes a diaphragm 174 and a spring 176 which also help create the dampening effect.

The second port of gas amplifying valve communicates with the controlled atmosphere outlet 136 via a second damper 132. Second damper 132 is very similar if not the same in construction as first damper 116 in that it is designed to smooth out pulsations or pressures or vacuum spikes that are found between the portion of air conduit 124 extending between the second port 178 of gas amplifying valve 106 and the inlet of second damper 132.

Safety shutoff 120 has a switch 128 which remains in the closed position as long as there is a certain predetermined pressure differential between the vacuum conduit 114 and the air conduit 124 which the safety shutoff 120 is communicating with.

One side of diaphragm 122 is communicating with vacuum conduit 114 and the other side of diaphragm 122 is communicating with air conduit 124.

In the event of no pressure differential for example between the vacuum conduit 114 and the air conduit 124 switch 128 would be moved to the open position 130 by actuator 126 attached to diaphragm 122.

In this manner modulating burner 100 in which both the flow of air and the fuel is modulated provides firing rates of approximately 50% to 100% of the total burner capacity, more preferably between 60% to 100% of the maximum burner capacity. It is possible that the burner may be modulated to some other preferred range depending upon the particular installation.

It should be apparent to persons skilled in the arts that various modifications and adaptation of this structure described above are possible without departure from the spirit of the invention the scope of which defined in the appended claim.

The invention claimed is:

1. A pneumatic modulating burner system comprises:
   a) a speed control responsive to inputs received from a thermostat, the speed control modulating a blower which provides modulated combustion air and a controlling vacuum proportional to the speed of the blower;
   b) a pneumatic gas amplifying valve in pneumatic communication with the vacuum via a vacuum conduit, the gas amplifying valve being controlled by the level of vacuum in the vacuum conduit providing modulated combustion gas responsive to the vacuum received from the vacuum conduit;
   c) wherein modulated combustion air and combustion gas are communicated to a burner for continuously variable firing rates proportional to the blower speed;
   d) wherein the vacuum conduit is in communication with a first pneumatic damper, wherein the first pneumatic damper is positioned between the blower and gas amplifying valve along the pneumatic control vacuum conduit, for smoothing out vacuum spikes and fluctuations caused by blower fluctuations, thereby providing a dampered vacuum portion of the vacuum conduit, terminates at a first port of the gas amplifying valve, thereby providing smooth vacuum control to the gas amplifying valve.

2. The modulating burner system claimed in claim 1 wherein the first port is in communication with the vacuum conduit and a second port is in communication with an air conduit; wherein the air conduit is in communication with a controlled atmosphere outlet within a control box housing the modulating burner system.

3. The modulating burner system claimed in claim 2 wherein the air conduit includes a second damper for smoothing out atmosphere pressure spikes and fluctuations seen at the second port.

4. The modulating burner system claimed in claim 3 further including a safety shutoff in communication with the vacuum conduit and the air conduit.

5. The modulating burner system claimed in claim 4, wherein the safety shutoff is actuated when there is substantially no pressure difference between the vacuum conduit and the air conduit.

6. The modulating burner system claimed in claim 3, wherein the second damper includes a diaphragm for smoothing out vacuum spikes and fluctuations.

7. The modulating burner system claimed in claim 6, wherein the second damper includes orifices restricting the flow of vacuum through the first damper, thereby smoothing out vacuum spikes and fluctuations in addition to the diaphragm.

8. The modulating burner system claimed in claim 1, wherein the first damper includes a diaphragm for smoothing out vacuum spikes and fluctuations.

9. The modulating burner system claimed in claim 8, wherein the first damper includes at least one orifice dampening the flow of vacuum through the first damper, thereby smoothing out vacuum spikes and fluctuations in addition to the diaphragm, wherein the orifice and diaphragm are in pneumatic communication and sequentially connected along the vacuum conduit.

10. The modulating burner system claimed in claim 8, wherein the first damper includes at least two orifices, each orifice in pneumatic communication with the diaphragm, for dampening the flow of vacuum through the first damper thereby smoothing out vacuum spikes and fluctuations in addition to the diaphragm, wherein the orifice and diaphragm are sequentially connected along the vacuum conduit.

11. The modulating burner system claimed in claim 1, wherein the first damper includes at least one orifices restricting the flow of vacuum through the first damper, thereby smoothing out vacuum spikes and fluctuations.

12. The modulating burner system claimed in claim 1, wherein the firing rates are modulated between 60% to 100% of the maximum firing rate.

* * * * *